(12) United States Patent
Ito

(10) Patent No.: US 11,057,470 B2
(45) Date of Patent: Jul. 6, 2021

(54) COMMUNICATION DEVICE AND COMMUNICATION METHOD FOR PROCESSING META DATA

(71) Applicant: FUJITSU LIMITED, Kawasaki (JP)

(72) Inventor: Akira Ito, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/697,802

(22) Filed: Nov. 27, 2019

(65) Prior Publication Data

US 2020/0195720 A1 Jun. 18, 2020

(30) Foreign Application Priority Data

Dec. 12, 2018 (JP) .............................. JP2018-232353

(51) Int. Cl.
*H04L 29/08* (2006.01)
*G06F 16/22* (2019.01)
(Continued)

(52) U.S. Cl.
CPC ........ *H04L 67/1097* (2013.01); *G06F 3/0604* (2013.01); *G06F 3/065* (2013.01);
(Continued)

(58) Field of Classification Search
CPC . H04L 67/1097; G06F 16/2228; G06F 16/13; G06F 3/0604; G06F 3/0619; G06F 3/065; G06F 3/067
(Continued)

(56) References Cited

U.S. PATENT DOCUMENTS 6,167,029 A * 12/2000 Ramakrishnan ...... G06F 13/385
370/235
7,457,892 B2 * 11/2008 Innis ........................ G06F 5/12
709/232
(Continued)

FOREIGN PATENT DOCUMENTS

EP 1643388 4/2006
JP 10-055301 2/1998
(Continued)

OTHER PUBLICATIONS

EESR—Extended European Search Report of European Patent Application No. 19210297.8 dated Mar. 11, 2020.
(Continued)

*Primary Examiner* — Nicholas R Taylor
*Assistant Examiner* — Chong G Kim
(74) *Attorney, Agent, or Firm* — Fujitsu Patent Center

(57) ABSTRACT

A communication device that is connected to a network includes: a receiver, a storage and a processor. The receiver receives meta data that includes attribution information of data and access information of the data. The storage stores the meta data received by the receiver; and a processor. The processor extracts a keyword from the attribution information that is included in the meta data and store, in the storage, index information in which the keyword and information for identifying the meta data are associated with each other. The processor transmits, to a participating node in the network, a stop request that is a request to step a transmission of meta data when an amount of the index information stored in the storage is larger than or equal to a specified threshold.

5 Claims, 10 Drawing Sheets

(51) Int. Cl.
*G06F 16/13* (2019.01)
*G06F 3/06* (2006.01)
(52) U.S. Cl.
CPC .......... *G06F 3/067* (2013.01); *G06F 3/0619* (2013.01); *G06F 16/13* (2019.01); *G06F 16/2228* (2019.01)
(58) Field of Classification Search
USPC ........................................................ 709/223
See application file for complete search history.

(56) References Cited

U.S. PATENT DOCUMENTS

| | | | | |
|---|---|---|---|---|
| 9,262,420 | B1* | 2/2016 | Schoeffler | G06F 16/958 |
| 2005/0015547 | A1 | 1/2005 | Yokohata et al. | |
| 2006/0026295 | A1* | 2/2006 | Iwamura | H04L 47/18 |
| | | | | 709/233 |
| 2007/0109970 | A1* | 5/2007 | Galimberti | H04L 47/10 |
| | | | | 370/235 |
| 2008/0240097 | A1* | 10/2008 | Kim | H04L 12/189 |
| | | | | 370/390 |
| 2011/0137984 | A1* | 6/2011 | Kim | H04L 65/608 |
| | | | | 709/203 |
| 2013/0041871 | A1* | 2/2013 | Das | G06F 16/134 |
| | | | | 707/662 |
| 2013/0042008 | A1* | 2/2013 | Das | G06F 16/21 |
| | | | | 709/226 |
| 2020/0195655 | A1* | 6/2020 | Das | G06F 16/2272 |

FOREIGN PATENT DOCUMENTS

| | | |
|---|---|---|
| JP | 10-116293 | 5/1998 |
| JP | 2006-293441 | 10/2006 |

OTHER PUBLICATIONS

EPOA—Office Action of European Patent Application No. 19 210 297.8 dated May 3, 2021. Note that US2013/0041871 cited in the EPOA was already filed with IDS dated Apr. 8, 2020.

* cited by examiner

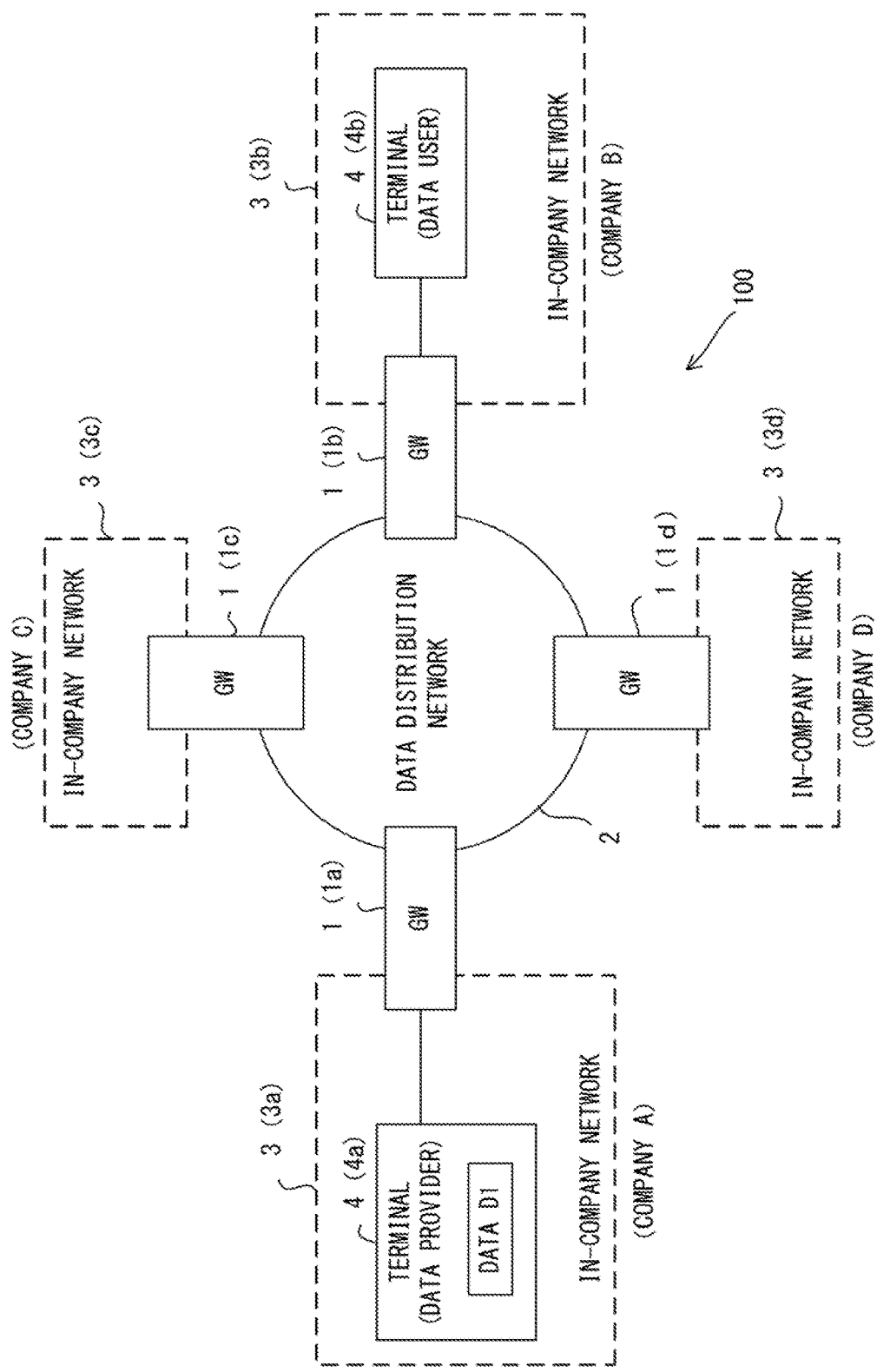
F I G. 1

```
<META DATA MD1>

DATA PROVIDER ID : XXXX01

ACCESS INFORMATION : URL OF SITE WHERE DATA D1 IS STORED

NODES ALLOWED TO ACCESS DATA : COMPANY B, COMPANY C

DESCRIPTIONS :
    THE DATA WAS CREATED BY ANALYZING HISTORY OF PURCHASE AT
    CONVENIENCE STORE ACCORDING TO CUSTOMERS' AGE AND SEX
```

F I G. 2

| KEYWORD | ID |
|---|---|
| CUSTOMER | MD 1 |
| AGE | MD 1 |
| SEX | MD 1 |
| CONVENIENCE STORE | MD 1 |
| PURCHASE HISTORY | MD 1 |
| ⋮ | |

F I G. 4

COMMUNICATION DEVICE AND COMMUNICATION METHOD FOR PROCESSING META DATA

CROSS-REFERENCE TO RELATED APPLICATIONS

This application is based upon and claims the benefit of priority of the prior Japanese Patent Application No. 2018-232353, filed on Dec. 12, 2018, the entire contents of which are incorporated herein by reference.

FIELD

The embodiments discussed herein are related to a communication device and a communication method for processing meta data.

BACKGROUND

Data distribution services have started to become widespread in recent years. A data provider in data distribution services may provide a data distribution network with data owned by this data provider. A data user may use data provided for the data distribution network.

When the scale of a data distribution network is large, it will be difficult to find a server that stores desired data. Thus, meta data is created for data provided for the data distribution network. The meta data includes access information and attribute information of the provided data. The meta data is supplied to one or more gateways. For example, the gateway may be implemented in an in-company network run by each company.

Upon receipt of a search request pertaining to requested data from a data user, the gateway provides meta data corresponding to the request to the data user. However, when the gateway does not have meta data corresponding to the request received from the data user, the gateway acquires meta data corresponding to the received request, from another gateway and provides this meta data to the data user. In this situation, for example, the gateway may broadcast the search request to all gateways connected to the data distribution network.

The data user decides according to the attribute information included in the acquired met a data whether the data is useful. When deciding that the data is useful, the data user accesses, by using the access information, a site where the data is stored. As a result, the data user can use the desired data.

A proposed distributed database device is one that can use a database via a server computer of a section to which this device belongs, even when server computers in other locations have been stopped (e.g., Japanese laid-open Patent Publication No. 10-055301). A technique proposed for a distributed database control system is one for avoiding load growth that could be caused by a server provided for a certain site being intensively accessed (e.g., Japanese laid-open Patent Publication No. 10-116293). A technique has been proposed for performing very fast data retrieval without the need for a large capacity storage (e.g., Japanese Laid-open Patent Publication No. 2006-293441).

In the data distribution network described above, meta data created for data to be provided is supplied to one or more gateways. In this situation, for example, the meta data may be managed by a distribution registry such as a block chain. A plurality of computers inspect transactions on the network, and only transactions for which a consensus has been built are recorded in the distribution registry. Hence, a highly reliable system can be established without providing a server for managing the entirety of the network.

However, it is difficult to determine which node holds meta data for desired data in a configuration in which meta data is managed in a distributed manner. Hence, traffic pertaining to a search request broadcast to all participating nodes will increase when the scale of the data distribution network is large.

For example, such a problem may be solved if each participating node (i.e., each gateway) holds an increased amount of meta data. However, a gateway administrator may feel resistance in increasing a memory capacity for holding meta data. Hence, even if some gateways hold a large amount of meta data, a traffic amount associated with the broadcasting of a search request will not be markedly decreased as long as other gateways hold only a little amount of meta data.

SUMMARY

According to an aspect of the embodiments, a communication device that is connected to a network includes: a receiver configured to receive meta data that includes attribution information of data and access information of the data; a storage configured to store the meta data received by the receiver; and a processor. The processor is configured to extract a keyword from the attribution information that is included in the meta data and store, in the storage, index information in which the keyword and information for identifying the meta data are associated with each other; and is configured to transmit, to a participating node in the network, a stop request that is a request to stop a transmission of meta data when an amount of the index information stored in the storage is larger than or equal to a specified threshold.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of a communication system in accordance with embodiments of the present invention;

FIG. 2 illustrates an example of meta data;

FIG. 4 illustrates an example of a meta data table;

DESCRIPTION OF EMBODIMENTS

Figure 3:
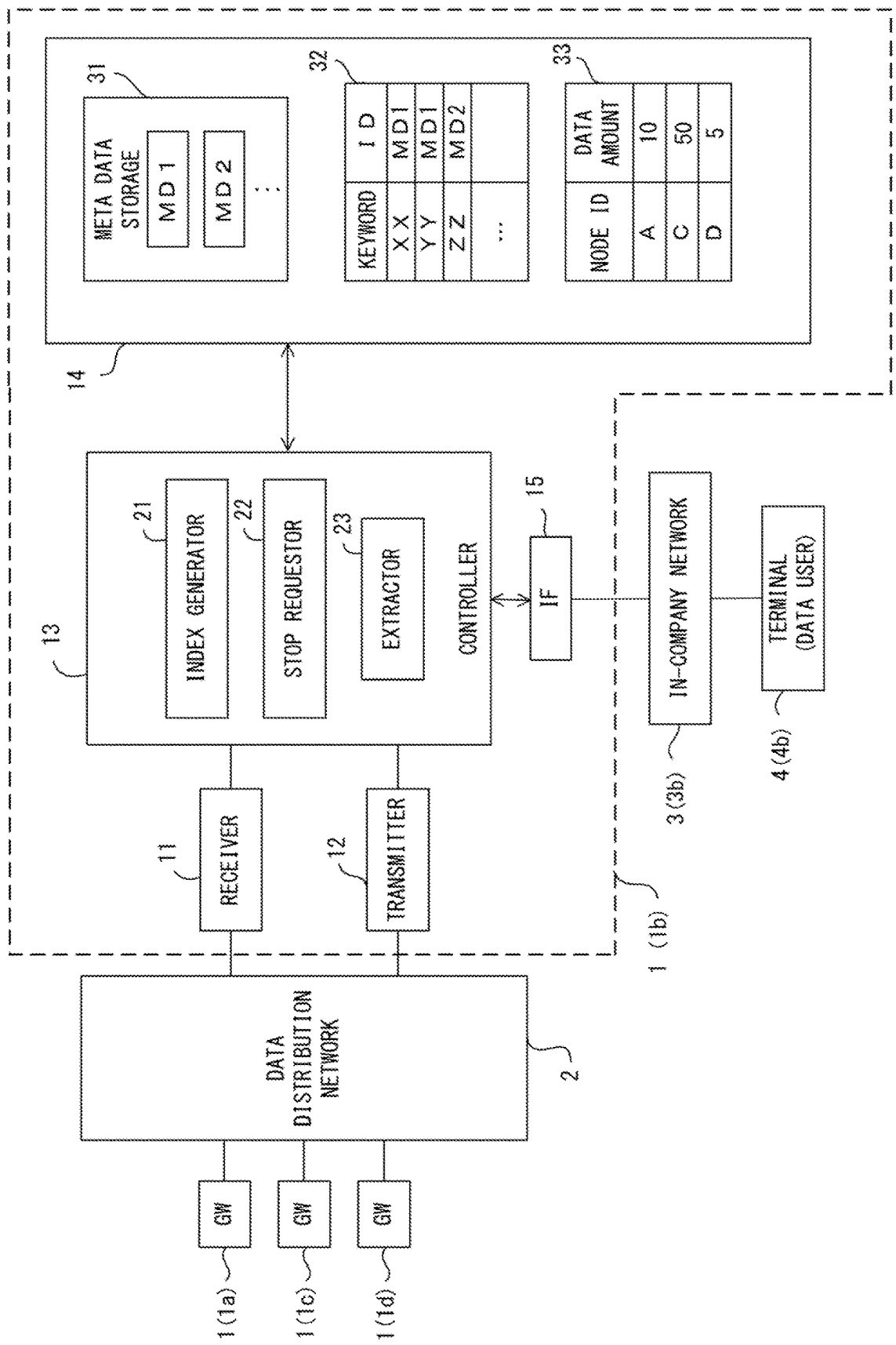
FIG. 3 illustrates an example of the configuration of a gateway device.

FIG. 1 illustrates an example of a communication system in accordance with embodiments of the present invention. A communication system 100 in accordance with embodiments of the invention Includes a plurality of gateway devices 1 (1a-1d). The gateway devices 1 are connected to a data distribution network 2. For example, the data distribution network 2 may include a plurality of routers. The data distribution network 2 may be a virtual network for forwarding data and information pertaining to data distribution services.

Each of the gateway devices 1 is provided between an in-company network 3 and the data distribution network 2. In-company networks 3a-3d may be private networks (e.g., LANs and/or WANs) used by companies A-D, respectively. The gateway devices 1a-1d may be managed by the companies A-D, respectively.

One or more terminal devices 4 are connected to each of the in-company networks 3. For example, the terminal device 4 may be a computer used by a user in a company. Alternatively, the terminal device 4 may be a server computer managed in a company. In the example depicted in FIG. 1, a terminal device 4a is connected to the gateway device 1a in the in-company network 3a. A terminal device 4b is connected to the gateway device 1b in the in-company network 3b.

Each user may provide data that he/she owns for the data distribution network 2. Accordingly, each user may provide data that he/she owns for other users by using the data distribution network 2. Each user may acquire data provided from other users by using the data distribution network 2.

In this example, a user belonging to the company A (hereinafter referred to as a data provider) provides the data distribution network 2 with data D1. The terminal device 4a is a computer used by the data provider. A user belonging to the company B (hereinafter referred to as a data user) uses data D1 by using the data distribution network 2. The terminal device 4b is a computer used by the data user.

The data provider may designate an object to be allowed to access data D1. In particular, the data provider may designate a user who is to be allowed to use data D1. In this example, the data provider allows users in the companies B and C to use data D1.

The data provider creates meta data (hereinafter referred to as meta data MD1) for data D1 when providing the data distribution network 2 with data D1. Meta data MD1 includes access information and attribute information of data D1. The access information indicates information for accessing data D1. Accordingly, the access information included in meta data MD1 indicates, for example, the address or URI, of a storage region in which data D1 is stored. The attribute information includes information describing the compendium of data D1. Specifically, the attribute information included in meta data MD1 describes, for example, what type of information is included in data D1.

FIG. 2 illustrates an example of meta data. In this example, meta data MD1 includes a data provider ID, access information, nodes allowed to access the data, and descriptions. The data provider ID indicates the ID of a user who provides data D1. The access information indicates information on a site where data D1 is stored (e.g., URL). The nodes allowed to access data, which indicate users who can use data D1, are designated by the data provider. The descriptions are brief descriptions of the details of data D1.

When providing the data distribution network 2 with data D1, the data provider transmits the meta data MD1 created for data D1 to the gateway device 1a. Then, the gateway device 1a registers the meta data MD1 received from the data provider in a specified memory region in the gateway device 1a. Hence, meta data MD1 is registered in the gateway device 1a. The gateway device 1a also transmits meta data MD1 to participating nodes designated in meta data MD1 as nodes allowed to access the data. In the example depicted in FIG. 2, the companies B and C are designated as nodes allowed to access the data. In this situation, the gateway device 1a transmits meta data MD1 to the gateway devices 1b and 1c. The gateway device 1a does not transmit meta data MD1 to the gateway device 1d. A "participating node" indicates a node to which a user who has participated in data distribution services provided by the data distribution network 2 belongs.

Upon receipt of meta data MD1 from another node, each gateway device 1 performs a registration process for the meta data. The following describes a registration process performed when the gateway device 1b receives meta data MD1 from the gateway device 1a.

FIG. 3 illustrates an example of the configuration of the gateway device 1. As depicted in FIG. 3, the gateway device 1 includes a receiver 11, a transmitter 12, a controller 13, a storage 14, and an interface 15. The gateway device 1 may include other circuits or functions that are not depicted in FIG. 3.

The receiver 11 receives data and/or information transmitted from other participating nodes (gateway devices 1a, 1c, and 1d in this example) over the data distribution network 2. The transmitter 12 transmits data and/or information to other participating nodes over the data distribution network 2. The interface 15 is connected to the in-company network 3.

The controller 13 controls operations of the gateway device 1. The controller 13 includes an index generator 21, a stop requestor 22, and an extractor 23, which will be described hereinafter. The controller 13 may include other functions that are not depicted in FIG. 3. The storage 14 includes a meta data storage 31. In addition, the storage 14 stores a meta data table 32 and a data amount table 33.

The receiver 11 of the gateway device 1b receives the meta data MD1 transmitted from the gateway device 1a. The receiver 11 passes the received meta data MD1 to the controller 13.

The controller 13 stores the received meta data MD1 in the meta data storage 31. The meta data storage 31 stores meta data that the gateway device 1b receives from other participating nodes. The controller 13 also stores meta data received from users under the gateway device 1b (i.e., users connecting to the in-company network 3b) in the meta data storage 31.

The index generator 21 generates index information for the received meta data. In particular, the index generator 21 extracts a keyword from attribute information included in meta data MD1. The index generator 21 generates index information in which the keyword extracted from the attribute information and information for identifying the meta data are associated with each other. The index information generated by the index generator 21 is registered in the meta data table 32.

For example, when the gateway device 1b receives the meta data MD1 depicted in FIG. 2, the index generator 21 extracts a keyword from the "descriptions" in the attribute information. Methods for extracting words considered to be important from a given sentence are not particularly limited and may be realized using any publicly known technique. In this example, "customer", "age", "sex", "convenience store", and "purchase history" are extracted through an extraction process. In this situation, the index generator 21 registers index information pertaining to meta data MD1 in the meta data table 32, as depicted in FIG. 4. The "ID" recorded in the meta data table 32 may be information for identifying data described by meta data, rather than information for identifying meta data.

The registration process is performed by each of the gateway devices 1 that have received meta data. For example, meta data MD1 may be transmitted from the gateway device 1a to the gateway devices 1b and 1c. Hence, a similar registration process is also performed by the gateway device 1c.

A user (data user in this example) in each in-company network 3 may search for desired data by using meta data supplied to the gateway device 1 of the node to which this user belongs. In this situation, for example, the data user may input a keyword by using a data search application provided from the data distribution network 2. This keyword is received by the gateway device 1. For example, a keyword input by a data user connected to the in-company network 3b may be received by the gateway device 1b.

The extractor 23 of the gateway device 1b searches the meta data table 32 by the keyword received from the data user. The extractor 23 decides whether index information that includes the keyword received from the data user has been registered in the meta data table 32. When the keyword is matched, the extractor 23 specifies meta data that corresponds to this keyword and acquires the specified meta data from the meta data storage 31. The extractor 23 transmits, to the data user, the meta data acquired from the meta data storage 31 according to the keyword.

For example, when "keyword: convenience store AND purchase history" is input; from the terminal device (data user) 4b depicted in FIG. 3, the extractor 23 may specify meta data MD1 by searching the meta data table 32 depicted in FIG. 4. Then, the extractor 23 acquires meta data MD1 from the meta data storage 31 and transmits this meta data to the terminal device 4b.

A data user acquires, in the manner described above, meta data that corresponds to an input keyword. As indicated in FIG. 2, meta data includes access information of data described by this meta data. Hence, the data user may use the data by according to the access information.

However, the size of the storage 14 is limited, and the meta data storage 31 and/or the meta data table 32 could need to be reduced in size. Accordingly, an upper limit is set for the size of the meta data table 32 of the gateway device 1 in accordance with embodiments of the invention. Setting an upper limit for the size of the meta data table 32 will result in limiting the amount of meta data to be stored in the meta data storage 31.

The size of the meta data table 32 is monitored by the stop requestor 22. In particular, every time index information is added to the meta data table 32, the stop requestor 22 decides whether the amount of index information registered in the meta data table 32 is larger than or equal to a specified threshold. In this situation, the stop requestor 22 may decide whether the number of records for which index information has been registered in the meta data table 32 is larger than or equal to a specified threshold.

When the amount of index information registered in the meta data table 32 is larger than or equal to the specified threshold, the stop requestor 22 generates a stop request that is a request to stop transmission of meta data. The stop request is transmitted to each participating node in the data distribution network 2. For example, when the gateway device 1b depicted in FIG. 1 or 3 has generated a stop request, the transmitter 12 of the gateway device 1b may transmit this stop request to the gateway devices 1a, 1c, and 1d.

Upon receipt of the stop request, each of the gateway devices 1 stops transmission of meta data to the node that is the source of the stop request. For example, when the gateway device 1a has received a stop request from the gateway device 1b, the gateway device 1a may stop transmission of meta data to the gateway device 1b. However, the gateway device 1a does not stop transmission of meta data to the gateway devices 1 other than the gateway device 1b.

A gateway device 1 that, has received a stop request generates data amount information. The data amount information indicates the amount of data that has been provided from users under the gateway device 1 to the data distribution network 2 after the gateway device 1 received the stop request. Alternatively, the data amount information indicates the number of data products that have been provided from users under the gateway device 1 to the data distribution network 2 after, the gateway device 1 received the stop request. Then, the gateway device 1 that has received the stop request transmits the generated data amount information to the node that is the source of the stop request. For example, when the gateway device 1a has received a stop request from the gateway device 1b, the gateway device 1a may generate and transmit data amount information to the gateway device 1b. The gateway device 1a may generate data amount information indicating the amount of data that the gateway device 1b is allowed to access from among the data newly provided to the data distribution network 2. In this situation, the data amount information indicates the amount of data that the node that is the source of the stop request is allowed to access from among the data newly provided to the data distribution network 2.

For example, data amount information may be generated or updated every time a gateway device 1 receives meta data that corresponds to new data from a user. Every time data amount information is generated or updated, the gateway device 1 may transmit latest data amount information to a node that is the source of a stop request. Alternatively, the gateway device 1 may periodically transmit latest data amount information to a node that is the source of a stop request. For example, data amount information may be generated and transmitted every hour.

Figure 5:
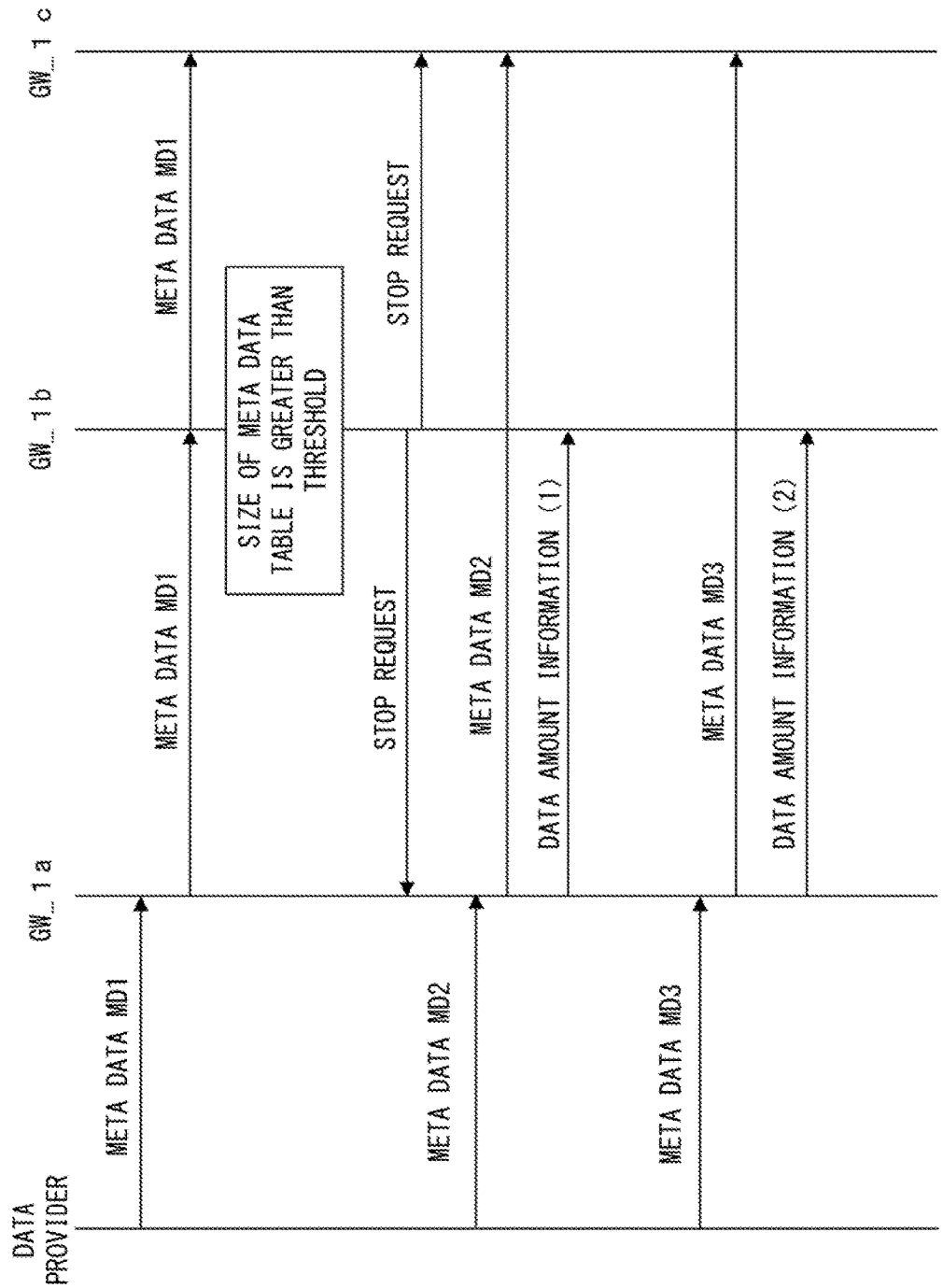
FIG. 5 illustrates an example of a sequence of transmission of meta data in a data distribution network.

FIG. 5 illustrates an example of a sequence of transmission of meta data in the data distribution network 2. In this example, a user belonging to a company A (data provider) provides data to the data distribution network 2. In this situation, meta data that corresponds to each piece of data is transmitted from the data provider to the gateway device 1a. Assume that the data can be accessed by companies B and C.

In this situation, the gateway device 1a transmits meta data that corresponds to each piece of data to the gateway devices 1b and 1c. The gateway devices 1b and 1c respectively store the received meta data in the meta data storage 31, generate index information for the received meta data, and register the index information in the meta data table 32. The gateway device 1a also stores the meta data in the meta data storage 31, generates index information for the meta data, and registers the index information in the meta data table 32.

Assume that the amount of index information stored in the meta data table 32 of the gateway device 1b has become larger than or equal to a threshold. In this situation, the gateway device 1b transmits a stop request to each participating node (gateway devices 1a and 1c with reference to FIG. 5).

After receiving the stop request from the gateway device 1b, the gateway device 1a stops transmission of meta data to the gateway device 1b. For example, when meta data that corresponds to data that the companies B and C are allowed to access is received from the data provider, the gateway device 1a transmits the meta data to the gateway device 1c but does not transmit this meta data to the gateway device 1b. In the example depicted in FIG. 5, the gateway device 1a transmits meta data MD2 and MD3 to the gateway device 1c alone.

The gateway device 1a counts the number of data products provided from the data provider to the data distribution network 2 after the stop request was received from the gateway device 1b. The gateway device 1a generates and transmits data amount information indicating a result of the count to the node that is the source of the stop request (i.e., gateway device 1b).

In the example depicted in FIG. 5, meta data MD2 is registered for the first, data provided by the data provider after the gateway device 1a received the stop request. In this situation, the gateway device 1a transmits, to the gateway device 1b, data amount information ("DATA AMOUNT INFORMATION (1)" in FIG. 5) indicating that one data product has been provided to the data distribution network 2 after the stop request was made. Subsequently, meta data MD3 is registered for the second data provided by the data provider after the gateway device 1a received the stop request. In this situation, the gateway device 1a transmits, to the gateway device 1b, data amount information ("DATA AMOUNT INFORMATION (2)" in FIG. 5) indicating that two data products have been provided to the data distribution network 2 after the stop request was made.

When data amount information is received from another participating node, the gateway device 1 updates the data amount table 33. As depicted in FIG. 3, the data amount table 33 records node IDs and data amounts associated with each other, "node ID" indicates a node that is the source of data amount information. "data amount" indicates the number of data products reported by data amount information.

As described above, when the amount of index information stored in the meta data table 32 of a certain gateway device 1 (hereinafter referred to as "this gateway device") has become larger than or equal to the threshold, this gateway device transmits a stop request to participating nodes. Then, this gateway device no longer receives met a data from the participating nodes. Hence, even when a participating node has meta data addressed to this gateway device, the meta data will not be transmitted to this gateway device. In this situation, the gateway device of the participating node transmits, to this gateway device, data amount information indicating the amount of meta data that would have been transmitted to this gateway device if the stop request had not been made. Accordingly, the data amount recorded in the data amount table 33 of this gateway device indicates, for each of the participating nodes, the amount of meta data that would have been transmitted to this gateway device but is stored at the participating node without being transmitted to this gateway device.

The data amount table 33 may be referred to when a gateway device 1 has received a keyword for a data search from a data user. In particular, when a gateway device 1 has received a keyword from a data user, the extractor 23 searches the meta data table 32 with the keyword. When the keyword is matched, the extractor 23 acquires meta data that corresponds to the keyword from the meta data storage 31 and transmits this meta data to the data user. When the keyword is not matched, the extractor 23 refers to the data amount table 33 so as to specify a participating node for which a request to perform a search is to be made. Then, the extractor 23 makes a request for the specified participating node to perform a data search.

As an example, the extractor 23 may specify a participating node that has the largest data amount in the data amount table 33. The extractor 23 makes a request for the specified participating node to perform a data search. In the example depicted in FIG. 3, the node C will be specified. The data amount recorded in the data amount table 33 of the given gateway device indicates the amount of meta data that would have been transmitted to the gateway device 1b but is stored at the participating nodes without being transmitted to the gateway device 1b. Thus, a participating node that has a large data amount is highly likely to hold meta data that corresponds to a keyword. Accordingly, the extractor 23 makes a request for the node C (i.e., gateway device 1c) to perform a data search. In response to the search request from the gateway device 1b, the gateway device 1c performs a search by using the meta data table 32 in the node to which the gateway device 1c belongs and transmits a search result to the gateway device 1b.

As described above, after the amount of index information stored in the meta data table 32 has become larger than or equal to the threshold, the gateway device 1 no longer receives meta data from other participating nodes. However, by referring to the data amount table 33, the gateway device 1 can specify a participating node that is highly likely to store meta data that corresponds to data needed by a user. Accordingly, it is highly likely that meta data that corresponds to the data needed by the user can be acquired without broadcasting a search request to all nodes. Hence, the traffic amount associated with the search of meta data can be decreased while reducing the amount of information (that is, meta data) stored in the storage 14.

Figure 6:
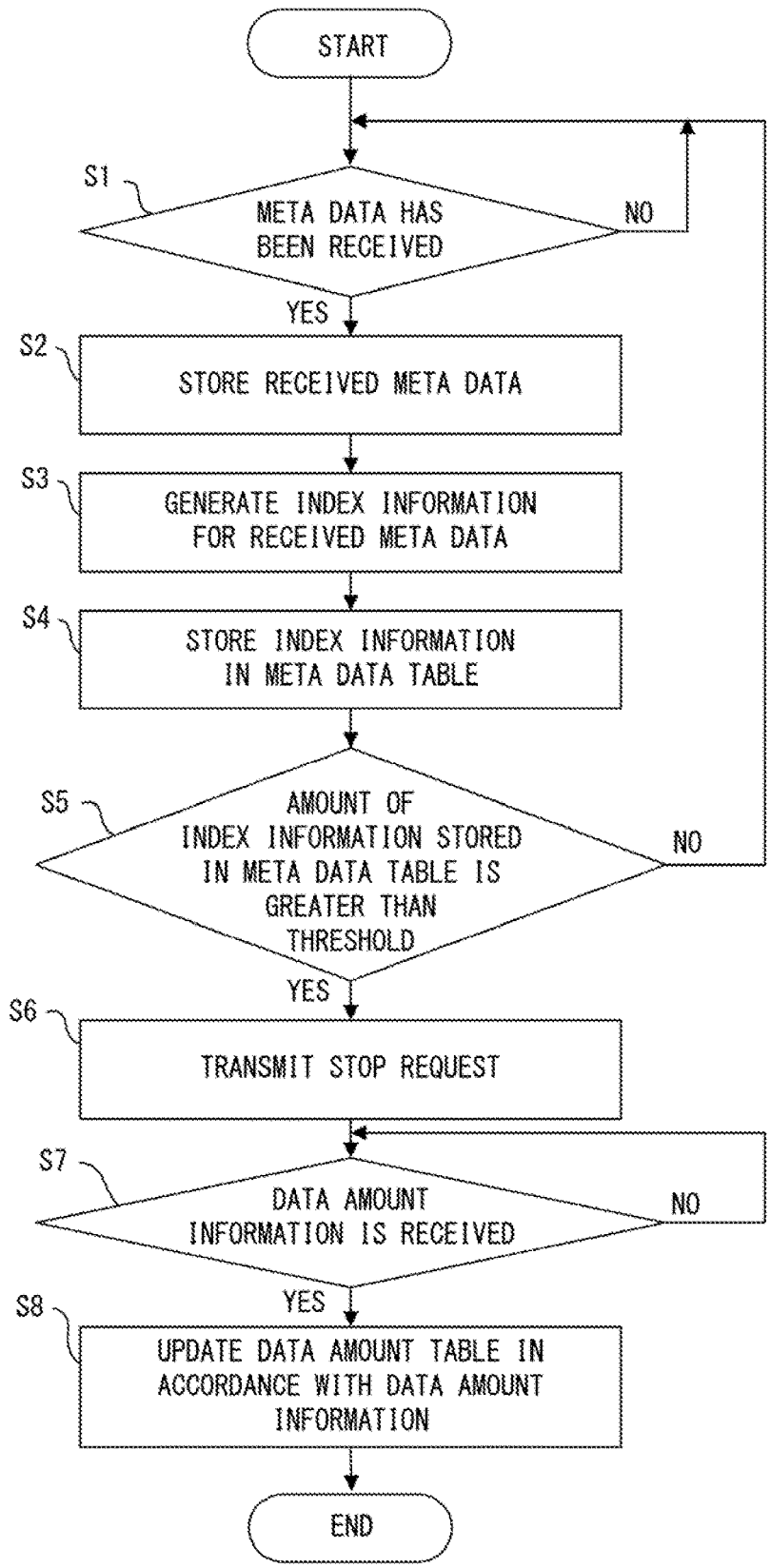
FIG. 6 is a flowchart indicating an example of processing performed by a gateway device that has received meta data.

FIG. 6 is a flowchart indicating an example of processing performed by a gateway device 1 that has received meta data. The gateway device 1 may receive meta data from users within the node to which the gateway device 1 belongs or from other participating nodes.

In S1, the controller 13 waits for meta data. Meta data transmitted from another participating node is received by the receiver 11, while meta data transmitted from a user within the node to which this controller belongs is received by the interface 15. When meta data is received, the controller 13 performs processes of S2-S8.

In S2, the controller 13 stores the received meta data in the meta data storage 31. In S3, the index generator 21 generates index information for the received meta data. The index information includes a keyword extracted from the meta data and information for identifying the meta data. In S4, the generated index information is stored in the meta data table 32.

In S5, the stop requestor 22 decides whether the amount of index information stored in the meta data table 32 is larger than or equal to a threshold. When the amount of index information is larger than or equal to the threshold, the stop requestor 22 transmits a stop request, to the participating nodes in S6. The stop request is a request to stop transmission of meta data. The stop request may include information for requesting transmission of data amount information that indicates the amount of data (or the number of data products) provided from a participating node to the data distribution network 2 after the stop request is transmitted to the participating node, in addition to information for making a request to stop transmission of meta data.

A gateway device 1 that, has received the stop request stops transmission of meta data and transmits data amount information to the node that is the source of the stop request. The data amount information indicates the amount of data provided to the data distribution network 2 after the stop request was received (or the amount of meta data that corresponds to data provided to the data distribution network 2 after the stop request was received).

In S7, the controller 33 waits for data amount information transmitted from the other participating nodes. When data amount information is received, the controller 13 updates the data amount table 33 in accordance with the received data amount information in S8. The data amount table 33 records, for each of the participating nodes, the latest data amount reported by data amount information.

Figure 7:
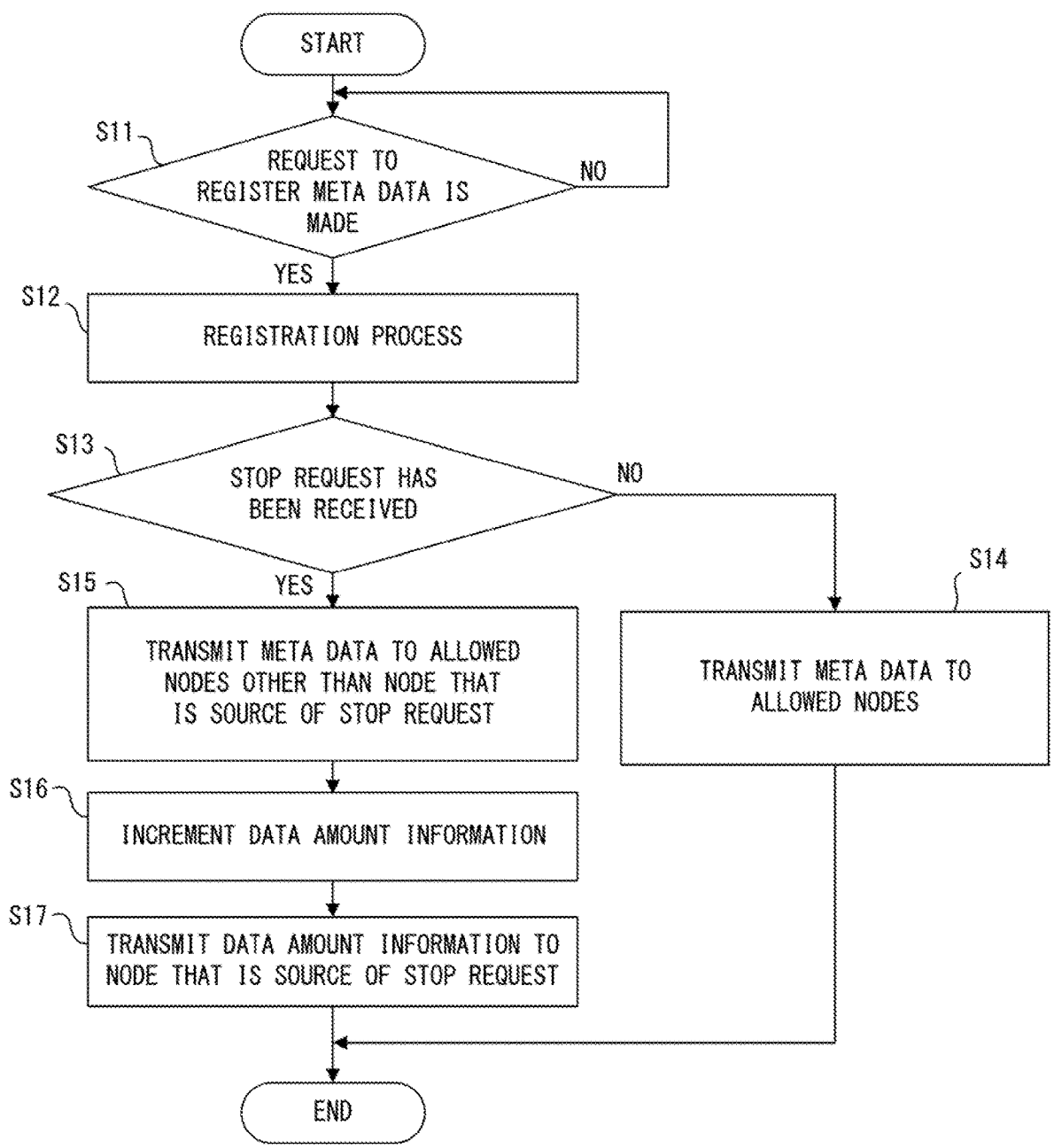
FIG. 7 is a flowchart indicating an example of processing performed by a gateway device that has received a request to register meta data from a data provider.

FIG. 7 is a flowchart indicating an example of processing performed by a gateway device 1 that has received a request to register meta data from a data provider. When providing data owned by a data provider to the data distribution network 2, the data provider generates meta data for the data and registers this meta data in the gateway device 1.

In S11, the controller 13 waits for a request to register meta data from data providers. When a request to register meta data is received, the controller 13 performs processes of S12-S17.

In S12, the controller 13 performs a registration process. This registration process is substantially the same as the processes of S2-S4 depicted in FIG. 6. Accordingly, the controller 13 stores meta data that is received from a data provide in the meta data storage 31 and stores index information generated for the meta data in the meta data table 32.

In S13, the controller 13 decides whether a stop request has been received from another participating node. When a stop request has not been received, the controller 13 transmits, in S14, meta data to nodes that are allowed to access data corresponding to the meta data. An object to be allowed to access the data is designated by the data provider and described by the meta data as depicted in FIG. 2.

When a stop request has been received, the controller 13 transmits, in S15, meta data to the nodes allowed to access the data other than the node that is the source of the stop request. In S16, the controller 13 increments data amount information. In this example, the latest data amount information is recorded in a specified region within the storage 14. In this situation, the data amount information indicates the total amount of data provided to the data distribution network 2 after the stop request was made.

In S17, the controller 13 transmits data amount information to the node that is the source of the stop request. However, the controller 13 does not need to transmit data amount information every time meta data is received from a data provider. For example, irrespective of reception of new meta data, the controller 13 may periodically transmit data amount information. In a case where data amount information is transmitted every time meta data is received from a data provider, data amount information may indicate that "data has been newly provided" instead of indicating the "total" amount of data that has been provided to the data distribution network 2 after a stop request was made. In this case, the data amount information indicates a value of "1".

Figure 8:
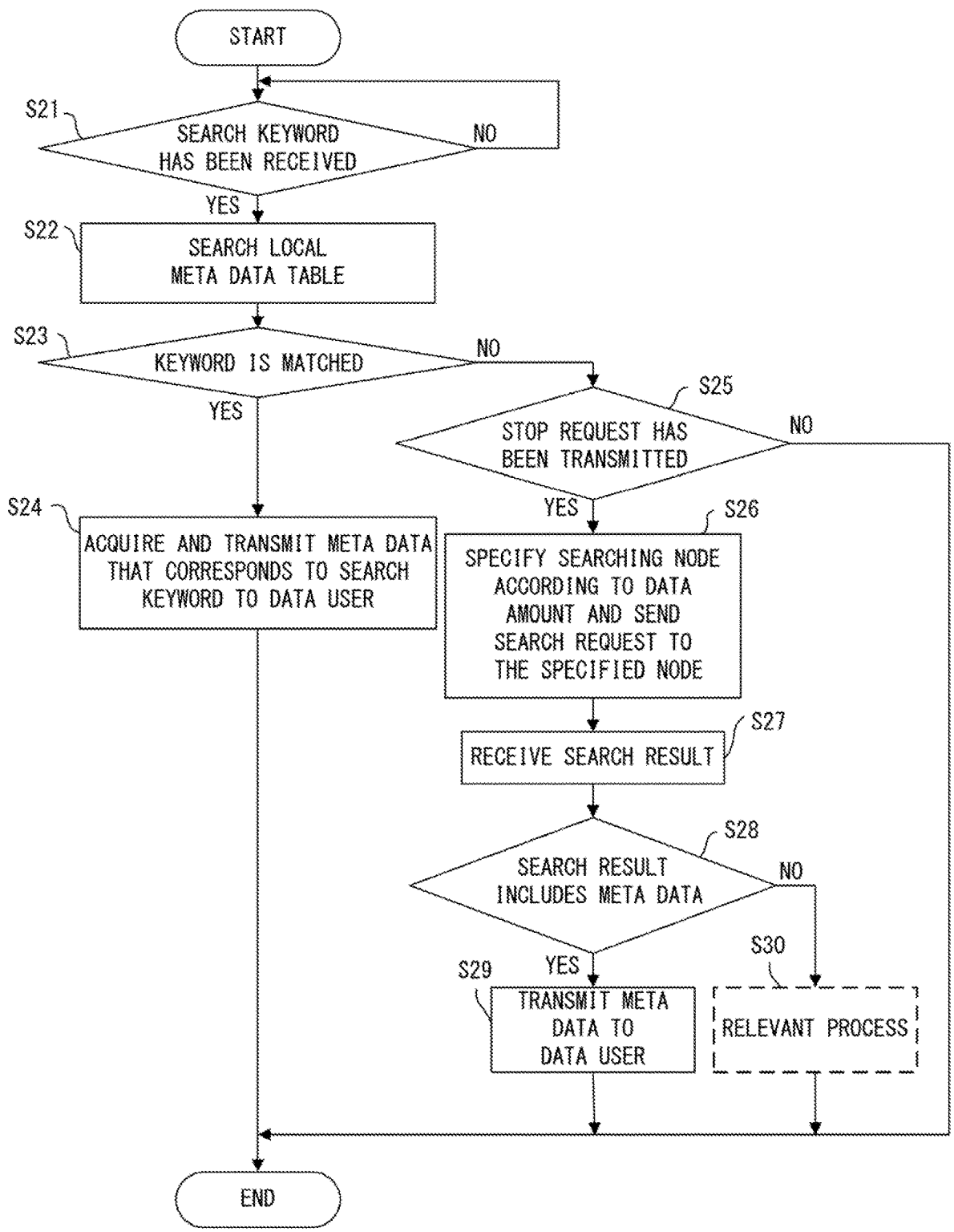
FIG. 8 is a flowchart indicating an example of processing performed by a gateway device that has received a search request from a data user.

FIG. 8 is a flowchart indicating an example of processing performed by a gateway device 1 that has received a search request from a data user. The data user inputs a keyword pertaining to desired data by using a data search application. Then, the search keyword is transmitted from the terminal device A to the gateway device 1.

In S21, the extractor 23 waits for a search keyword from a data user. Upon receipt of a search keyword, the extractor 23 performs processes of S22-S30.

In S22-S23, the extractor 23 searches the meta data table 32 in a local storage with the keyword input from the data user. When the keyword is matched in the search, the extractor 23 acquires, in S24, meta data that, corresponds to the search keyword from the meta data storage 31. Then, the extractor 23 transmits the acquired meta data to the data user.

When the keyword is not matched in the search, the extractor 23 decides in S25 whether the stop requestor 22 has transmitted a stop request to another participating node. When a stop request, has been transmitted, the extractor 23 specifies, in S26, a searching node in accordance with data amounts recorded in the data amount table 33. As an example, a participating node that has the largest data amount recorded in the data amount table 33 may be specified as the searching node. The extractor 23 sends a search request, to the specified searching node. In this situation, the extractor 23 transmits the search keyword input from the data user to the searching node.

The gateway device 1 that, has received the search request searches for meta data that corresponds to the keyword. The search result will be transmitted to the node that is the source of the search request.

In S27, the extractor 23 receives the search result from the gateway device 1 in the searching node. In S28, the extractor 23 checks whether the received search result includes meta data. When the received search result includes meta data, the extractor 23 transmits the meta data to the data user in S29.

When the received search result does not include meta data, the extractor 23 may perform a relevant process in S30. For example, the relevant process may be a process in which the extractor 23 specifies a participating node that has the second largest data amount in the data amount table 33 and sends a search request to this participating node. In this situation, the extractor 23 may access participating nodes in order of decreasing data amount until meta data is acquired. Alternatively, the extractor 23 may send a search request to all participating nodes. In these cases, the process of the extractor 23 returns to S27 after the relevant, process is performed.

When the keyword is not matched in the local storage (S23: No) and a stop request has not been transmitted (S25: No), the extractor 23 presents, to the data user, a message indicating that meta data that corresponds to the search keyword is not found. A similar message is presented to the data user when the keyword is not matched in the local storage and meta data is not received from another participating node.

Figure 9:
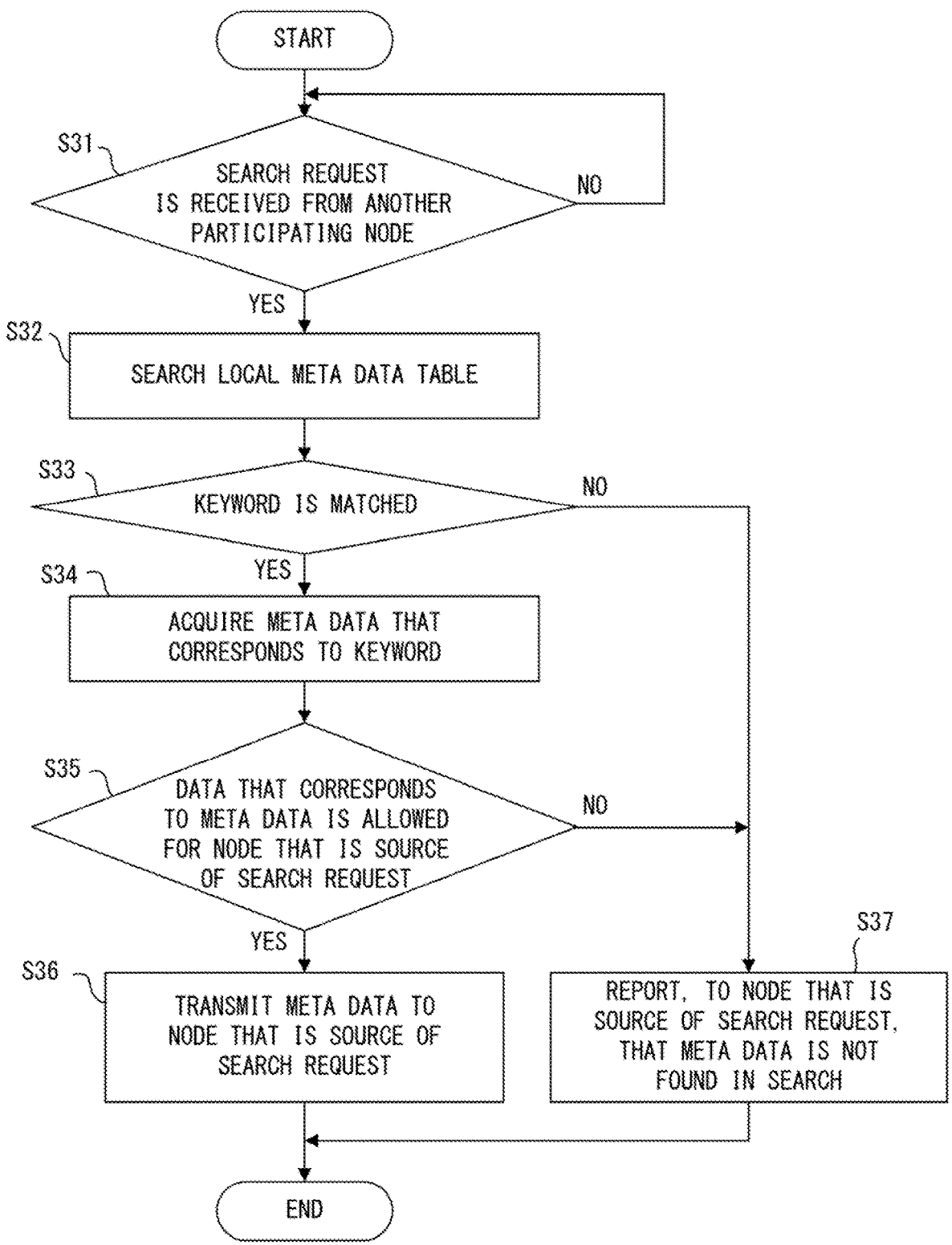
FIG. 9 is a flowchart indicating an example of processing performed by a gateway device that has received a search request from another participating node.

FIG. 9 is a flowchart indicating an example of processing performed by a gateway device 1 that has received a search request from another participating node. For example, the search request may be transmitted in S26 in FIG. 8. The search request, includes a search keyword input by a data user.

In S31, the controller 13 waits for a search request to be transmitted from another participating node. Upon receipt of a search request, the controller 13 performs processes of S32-S37.

The processes of S32-S34 are substantially the same as those of S22-S24 in FIG. 8. Hence, the extractor 23 searches, with the search keyword, the meta data table 32 in the local storage. When the keyword is matched in the search, the extractor 23 acquires meta data that corresponds to the search keyword from the meta data storage 31.

In S35, the extractor 23 checks whether the node that is the source of the search request has been allowed to access data that corresponds to the acquired meta data. The nodes allowed to access the data provided to the data distribution network 2 are described in the corresponding meta data, as depicted in FIG. 2. When the node that is the source of the search request is allowed to access the data that corresponds to the acquired meta data, the extractor 23 transmits the meta data to this node in S36. When the node that is the source of the search request is not allowed to access the data that corresponds to the acquired meta data, the extractor 23 transmits, to this source node in S37, a message indicating that meta data that corresponds to the search keyword is not found. When the keyword is not matched in the search in S33, a message indicating that meta data is not found is transmitted in S37 to the node that is the source of the search request.

A data provider may delete data provided to the data distribution network 2 by this data provider. When data has been deleted by a data provider, information for identifying the deleted data is reported to the participating nodes. Upon receipt of this report, each participating node deletes corresponding meta data from the meta data storage 31 and deletes, from the meta data table 32, index information generated from the meta data. When the amount of index information stored in the meta data table 32 has become less than a threshold as a result of the deletion, the step requestor 22 transmits, to each participating node, an invalidation request for invalidating a stop request transmitted in advance. The gateway device 1 of the participating node that has received the invalidation request resumes transmission of meta data to the node that is the source of the invalidation request.

Another Embodiment

When the amount of index information stored in the meta data table 32 has become larger than or equal to a threshold, the controller 13 may create a list of keywords registered in the meta data table 32 and transmit this list to each participating node. The gateway device 1 that has received the keyword list acquires meta data associated with a keyword included in the keyword list from the storage 14 in the local node and transmits the acquired meta data to the node that is the source of the keyword list. In this embodiment, a search pertaining to a keyword input by a data user is performed in the local node.

When the amount of index information stored in the meta data table 32 has become larger than or equal to a threshold, the controller 13 does not need to transmit a stop request to other participating nodes. In this situation, the gateway device 1 continues to receive meta data from other participating nodes. Accordingly, when the amount of index information stored in the meta data table 32 has become larger than or equal to a threshold, the gateway device 1 may discard one or more pieces of meta data and index information stored in the storage 14 in accordance with a rule determined in advance. For example, meta data and index information that correspond to unpopular data (i.e., data rarely searched for) may be discarded.

Figure 10:
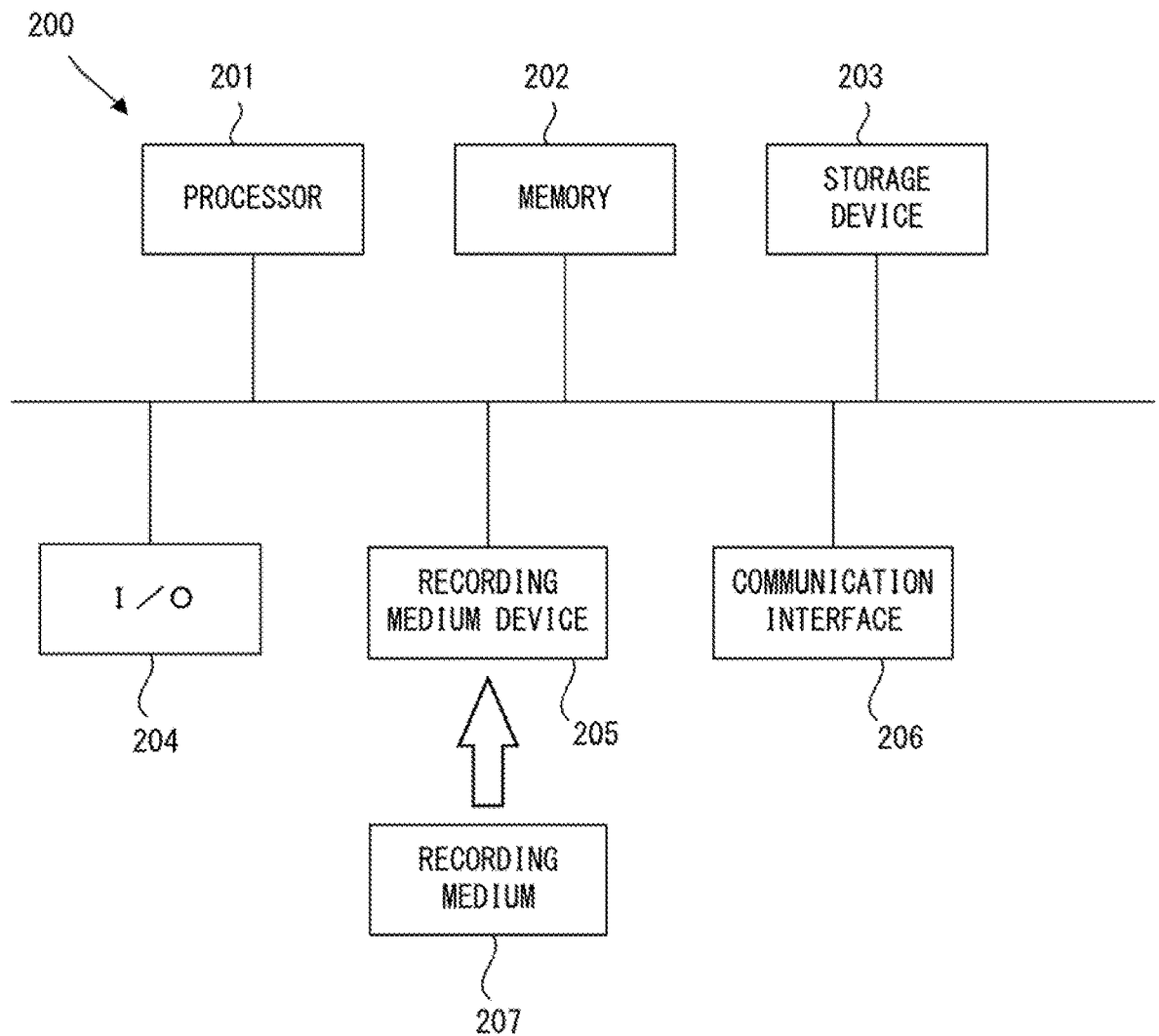
FIG. 10 illustrates an example of the hardware configuration of a computer operated as a gateway device.

FIG. 10 illustrates an example of the hardware configuration of a computer operated as a gateway device 1. A computer 200 includes a processor 201, a memory 202, a storage device 203, an I/O device 204, a recording medium device 205, and a communication interface 206.

The processor 201 may provide the function of the gateway device 1 by executing a communication program stored in the storage device 203. In particular, the processor 201 may provide the function for registering meta data and the function for accessing meta data by executing a communication program that describes the processes of the flowcharts depicted in FIGS. 6-9. The controller 13 depicted in FIG. 3 is implemented by the processor 201.

The memory 202 is, for example, a semiconductor memory and used as a work area for the processor 201. The storage device 203 may be implemented in the computer 200 or may be connected to the computer 200. The storage 14 depicted in FIG. 3 is implemented by the memory 202 and/or the storage device 203. The I/O device 204 accepts input of an instruction from a user or a network administrator. The I/O device 204 may output a result of processing performed by the processor 201. The recording medium device 205 reads a signal recorded in a removable recording medium 207. The communication program may be recorded in the removable recording medium 207. The communication interface 206 provides an interface for a connection to a network. The receiver 11, transmitter 12, and interface 15 depicted in FIG. 3 correspond to the communication interface 206.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A non-transitory computer-readable recording medium having stored therein a program for causing a processor in a communication device that is connected to a network to execute a communication process, the communication process comprising:
    receiving meta data that includes attribution information of data and access information of the data;
    storing the meta data in a first storage;
    extracting a keyword from the attribution information that is included in the meta data;
    storing, in a second storage, index information in which the keyword that is extracted from the attribution information and information for identifying the meta data are associated with each other; and
    transmitting, to a participating node via the network, a stop request that is a request to stop a transmission of meta data when an amount of the index information stored in the second storage is larger than or equal to a specified threshold, and wherein the stop request makes a request to stop a transmission of meta data and makes a request to transmit data amount information that indicates an amount of data that participating node has provided to the network after the stop request was transmitted to the participating node.

2. The non-transitory computer-readable recording medium according to claim 1, wherein
    when data amount information indicating an amount of data that the participating node has provided to the network after the stop request was transmitted to the participating node is received from the participating node, the data amount information is recorded while the data amount information being associated with information for identifying the participating node;

when the index information stored in the second storage includes a search keyword input by a user, meta data that corresponds to the search keyword is extracted from the first storage and the extracted meta data is provided to the user; and when the index information stored in the second storage does not include the search keyword, a search request to perform a search with the search keyword is transmitted to a participating node specified according to the data amount information.

3. The non-transitory computer-readable recording medium according to claim 2, wherein when the index information stored in the second storage does not Include the search keyword, a participating node that has provided the largest amount of data after the stop request was transmitted is determined according to the data amount information and the search request is transmitted to the determined participating node to perform a search with the search keyword.

4. A communication device connected to a network, the communication device comprising:

a receiver configured to receive meta data that includes attribution information of data and access information of the data;

a storage configured to store the meta data received by the receiver; and a processor configured to extract a keyword from the attribution information that is included in the meta data and store, in the storage, index information in which the keyword and information for identifying the meta data are associated with each other; and transmit, to a participating node via the network, a stop request that is a request to stop a transmission of meta data when an amount of the index information stored in the storage is larger than or equal to a specified threshold, and wherein the stop request makes a request to stop a transmission of meta data and makes a request to transmit data amount information that indicates an amount of data that participating node has provided to the network after the stop request was transmitted to the participating node.

5. A communication method to be used in a communication system that includes first and second communication devices connected over a network, wherein the first communication device receives meta data that includes attribution information of data and access information of the data, stores the meta data in a first storage, extracts a keyword from the attribution information that is included in the meta data, stores, in a second storage, index information in which the keyword that is extracted from the attribution information and information for identifying the meta data are associated with each other, and transmits, to the second communication device and a participating node in the network, a stop request that is a request to stop a transmission of meta data when an amount of the index information stored in the second storage is larger than or equal to a specified threshold, the second communication device before receiving the stop request from the first communication device, transmits, to the first communication device, meta data that corresponds to data provided to the network via the second communication device, and after receiving the stop request from the first communication device, stops a transmission of meta data to the first communication device and transmits, to the first communication device, data amount information indicating an amount of data provided to the network via the second communication device after the stop request was received, and the first communication device associates the data amount information with information for identifying the second communication device and records the data amount information and the information for identifying the second communication device, when the index information stored in the second storage includes a search keyword input by a user, acquires meta data that corresponds to the search keyword from the first storage and provides the acquired meta data to the user, and when the index information stored in the second storage does not include the search keyword, transmits a search request to perform a search with the search keyword to a participating node specified according to the data amount information.

* * * * *